United States Patent [19]

Mueller-Schloer

[11] 4,438,824

[45] Mar. 27, 1984

[54] APPARATUS AND METHOD FOR CRYPTOGRAHIC IDENTITY VERIFICATION

[75] Inventor: Christian Mueller-Schloer, Voorhees, N.J.

[73] Assignee: Siemens Corporation, Iselin, N.J.

[21] Appl. No.: 256,523

[22] Filed: Apr. 22, 1981

[51] Int. Cl.$^3$ .............................................. H04L 9/00
[52] U.S. Cl. .............................. 178/22.08; 178/22.11; 178/22.15; 340/825.34
[58] Field of Search ............... 178/22.08, 22.15, 22.11; 340/825.32, 825.33, 825.34; 235/379, 380, 382

[56] References Cited

U.S. PATENT DOCUMENTS

| | | | |
|---|---|---|---|
| 3,764,742 | 10/1973 | Abbott et al. | 178/22.08 |
| 3,798,605 | 3/1974 | Feistel | 178/22.08 |
| 4,004,089 | 1/1977 | Richard et al. | 178/22.15 |
| 4,148,012 | 3/1979 | Baump et al. | 340/825.32 |
| 4,193,131 | 3/1980 | Lennon et al. | 178/22.08 |
| 4,218,738 | 8/1980 | Matyas et al. | 178/22.08 |
| 4,264,782 | 4/1981 | Konheim | 178/22.08 |
| 4,315,101 | 2/1982 | Atalla | 178/22.08 |

FOREIGN PATENT DOCUMENTS 2060233 4/1981 United Kingdom ............. 178/22.08

OTHER PUBLICATIONS

Lagger, "Sicherheitsaspekte in Rechnergesteverten Kommunikationssystemen," Elektronische Rechenanlagen, 1980, pp. 276-280.
Needham, R. M., Schroeder, M. D., "Using Encryption for Authentication in Large Networks of Computers", Communic. ACM 21,12, (Dec. 1978), 993-999.
Rabin, M., "Digitalized Signatures", Foundations of Secure Computing, R. Demillo et al., Eds., Academic Press, New York, 1978.
Merkle, R. C., Hellman, M. E., "Hiding Information and Signatures in Trapdoor Knapsacks", IEEE Trans. Inf. Theory, vol. IT-24, No. 5, Sep. 1978.
Shamir, A., "A Fast Signature Scheme", MIT/LCS/T-M-107, Jul. 1978.
Diffie, W., Hellman, M. E., "New Directions in Cryptography", IEEE Transactions on Information Theory, vol. IT-22, No. 6, (1976), pp. 644-654.
McEliece, R. J., DSN Progress Report 42-44, 1978.
Kolata, G. B., "New Codes Coming into Use", Science, vol. 208, 1980, pp. 694-695.
National Bureau of Standards, Federal Information Processing Standard FIPS Publication 46, U.S. Department of Commerce, Washington, D.C., (Jan. 1977).
M. E. Hellman, "The Mathematics of Public-Key Cryptography", Scientific American, vol. 241, No. 2, (Aug. 1979).
Rivest, Shamir, Adleman, "A Method for Obtaining Digital Signatures and Public-Key Cryptosystems", Communications of the ACM, vol. 21, No. 2, (Feb. 1978).

*Primary Examiner*—Sal Cangialosi
*Attorney, Agent, or Firm*—Karl F. Milde, Jr.

[57] ABSTRACT

The apparatus for identity verification using a data card contains at least one terminal and a security service station. The terminal(s) and the station are connected to each other via a communication system. The terminal is provided with a central processing unit including a memory, a card reader for reading data from the data card, a sensor or number input device for introducing personal identification information, and a crypto module. The crypto module encrypts and decrypts data received from the memory under the control of the central processing unit. The security service station likewise also contains a central processing unit including a memory, and a crypto module. This station also contains a comparator for comparing personal identification information with reference personal identification information. Both kinds of information are transmitted to the station from the terminal.

8 Claims, 8 Drawing Figures

APPARATUS AND METHOD FOR CRYPTOGRAHIC IDENTITY VERIFICATION

BACKGROUND OF THE INVENTION

1. Field of the Invention

This invention relates to an apparatus for identity verification by means of a data card with protection against misuse of the card by unauthorized users. In particular, this invention relates to an apparatus yielding access to sensitive data stored on a personal data card only to the authorized owner. This invention also relates to a method based on cryptographic principles for identity veritication.

2. Description of the Prior Art

Plastic cards for different types of stored data are presently in wide use. Application examples are credit cards and cards bearing access control information for automatic teller machines. Such cards are used to perform authorizations.

However, these data cards suffer from some shortcomings: (A) The amount of data that can be stored on a card is limited. Presently the storage capacity is about 100 bytes. (B) The storage normally is of the read-only type. (C) It a card is lost there is only minimal protection against misuse.

In order to overcome these shortcomings, a so-called personal data card (PDC) is suggested. Such a personal data card would contain or be provided with a non-volatile (for instance, RAM type) storage device having a high storage capacity, for instance a storage capability of several kbytes. This PDC should also be provided with an effective protection against loss or unauthorized data access. Such a PDC could be used for a variety of new applications.

Examples for the kind of information that may be stored and for the usage of such a personal data card are the following:

(a) The PDC may be used as an electronic ID card containing personal data such as name, date and place of birth, height, Social Security Number, driver's license information, passport number, and address. The ID card could be used to help speed up procedures such as identifications of the owner and form fill-ins.

(b) The PDC may contain the health history of the owner combined with information about medical treatments, surgeries, vaccinations, allergies, anomalies, blood type, rh factor, etc. Availability and fast evaluation of these data are important in a case of emergency.

(c) The PDC may be used as personal key for communication security, e.g. containing, the owner's private signature key.

(d) The PDC may be used as a rechargeable credit card. The card issuer such as a bank "charges" or "loads" the card with a certain amount of money. With each use the owner withdraws a portion of this amount. After consumption of the total amount the card will be "recharged".

(e) The PDC may be used as a personal notebook and/or to store, for instance, frequently needed information such as telephone numbers.

A technical implementation of a PDC could be based on magnetic bubble memory chips. These chips would eliminate the above-mentioned shortcomings (A) and (B).

Also other read/write memories capable of storing data without a permanent energy supply may be used. Yet, the shortcoming (C), that is the problem of protecting the stored sensitive, confidential and/or secret data against unauthorized access and modification, still would remain.

In the prior art cryptographic principles [1–11], for instance for identity verification, are disclosed. Based on these cryptographic principles, symmetrical (the Data Encryption Standard or DES) and non-symmetrical systems (Public Key Cryptosystems) may be implemented. Symmetrical systems are described, for instance, in [1], whereas non-symmetrical systems are described, for instance, in [2–11].

One problem associated with presently known identity verification systems resides in the fact that the card reading terminal may be connected to a communication system which is unprotected from non-authorized individuals or intruders. Information contained in the card may be obtained by the intruder(s) via such a communication system. Obviously this should be prevented since sensitive or even secret data may be stored in the card. Another problem associated with conventional identity verification systems relates to information which remains stored in the terminal after a validation operation. This information may be read out by an intruder. Again, access to sensitive information should be prevented.

3. Literature

[1] National Bureau of Standards, Federal Information Processing Standard FIPS Publication 46, U.S. Department of Commerce, Washington, D.C. (Jan. 1977).

[2] M. E. Hellman, "The Mathematics of Public-Key Cryptography", Scientific American, Vol. 241, No. 2 (Aug. 1979).

[3] Rivest, Shamir, Adleman, "A Method for Obtaining Digital Signatures and Public-Key Cryptosystems", Communications of the ACM, Vol. 21, No. 2 (Feb. 78).

[4] Needham, R. M., Schroeder, M. D., "Using Encryption for Authentication in Large Networks of Computers", Communic. ACM 21,12 (Dec. 1978), 993–999.

[5] Rabin, M., "Digitalized Signatures", Foundations of Secure Computing, R. Demillo et al., Eds., Academic Press, New York 1978.

[6] Merkle, R. C., Hellman, M. E. "Hiding Information and Signatures in Trapdoor Knapsacks", IEEE Trans. Inf. Theory, Vol. IT-24, No. 5, Sept. 1978.

[7] Shamir, A., "A fast Signature Scheme", MIT/LCS/TM-107, July 1978.

[8] McEliece, R. J., DSN Progress Report 42–44, Jan./Feb. 1978.

[9] Lagger, H., Mueller-Schloer, C., Unterberger, H., "Sicherheitsaspekte in rechnergesteuerten Kommunikationssystemen", Elektronische Rechenanlagen, Oldenbourg Verlag Munich, Dec. 1980, p. 276–280.

[10] Diffie W., Hellman, M. E., "New Directions in Cryptography", IEEE Transactions on Information Theory, Vol. IT-22, No. 6, Nov. 1976, p. 644–654.

[11] Kolata, G. B., "New Codes Coming into Use", Science, Vol. 208, May 1980, p. 694–695.

SUMMARY OF THE INVENTION

Objects

It is an object of the invention to provide an apparatus for validation of a person presenting a data card, said apparatus being connected to an unprotected communication system and said card being nevertheless secure against intruders.

It is another object to provide an apparatus for yielding access to secret or sensitive data stored on a personal data card with protection against misuse of the card by unauthorized users.

It is still another object to provide an apparatus which contains a terminal having a card reader, whereby said terminal is connected to a communication system which may be unprotected against intruders.

It is still another object to provide an apparatus for validation of a personal data card which apparatus incorporates a terminal wherein no card information remains after a validation process.

It is still another object to provide an apparatus for validation of a personal data card which incorporates a terminal which does not contain a reference personal identification information on a permanent basis.

It is still another object to provide an apparatus for validation of a personal data card that contains secret or sensitive data in encrypted form and additionally reference personal identification information also in encrypted form.

It is still another object to provide a method for cryptographic identity verification providing for protection against intruders tapping the communication system used for transfer of messages.

It is also an object of this invention to provide a method for detection of a disconnection between a terminal and a communication system by performing a disconnection check.

It is still another object of this invention to provide a method for detection of a disconnection between any of a plurality of terminals and a communication system, without the predistribution of secret key information from said communication system to said terminals.

Summary

According to one aspect of this invention, an apparatus for identity verification using a data card is provided. In particular, the card is a personal data card. The apparatus grants protection against misuse of the data card by unauthorized users.

The apparatus contains a terminal and a security serVice station whcih are connected to each other by a communication system provided for transmitting digital data from the terminal to the security service station, and vice versa.

The terminal contains a first central processing unit having a first memory. This memory is provided for storage of a program, of a public network key, and of variables. The terminal also contains a card reader for reading data from the personal data card and for introducing these data into the first memory. The data stored on the card may include sensitive or even secret data. The terminal further contains an input device for introducing personal identification information, such as personal features or personal identification numbers, into the first memory. The terminal also contains a first crypto module which is connected to the first central processing unit. The first crypto module is adapted to encrypt and decrypt data received from the first memory under the control of the first central processing unit.

The security service station contains a second central processing unit having a second memory. This memory is provided for storage of a program, of a secret network key, and of variables. The station also contains a second crypto module which is connected to the second central processing unit. The second crypto module is adapted to encrypt and decrypt data received from the second memory under the control of the second central processing unit. The station further contains a comparator which is connected to the second central processing unit for comparing personal identification information transmitted from the terminal with reference personal identification information, also transmitted from the terminal.

According to another aspect of this invention, a method for cryptographic identity verification is provided. This method comprises the following steps:

(a) Reading card information from a personal data card and entering personal feature data into a terminal. The card information comprises reference feature data as well as a first key. The reference feature data and the first key are encrypted with a public network key thereby forming a first cryptogram.

(b) Generating a temporary key and a message number in the terminal.

(c) Encrypting the personal feature data, the first cryptogram contained in the card information, the message number and the temporary key with a public network key in the terminal. These data form a first message.

(d) Sending the first message to a security service station via a communication system.

(e) Decrypting the first message including the first cryptogram with a secret network key in the security service station. Thus the first key, the message number, the feature data, the reference feature data and the temporary key are obtained. The mentioned secret network key is correlated in a well-known manner to the public network key.

(f) Comparing the feature data and the reference feature data with each other in the security service station.

(g) Generating a modified message number by applying a publicly known function to the message number in the security service station.

(h) Encrypting the modified message number and the first key with the temporary key in the security service station. Thereby a second message is formed.

(i) Sending this second message back to the terminal via the communication system.

(j) Decrypting the second message with the temporary key in the terminal. Thereby the modified message number and the first key are obtained.

(k) Comparing the modified message number with a generated modified message number in the terminal. The generated modified message number is self-generated in the terminal by applying the publicly known function to the message number.

(l) Using the first key to decrypt the secret data.

The invention presents a solution to the problem of misuse protection of a lost data card. The invention uses personal feature extraction (or personal identification number entries) and verification (for instance, fingerprints or voice) in conjuction with cryptographic principles. Both cryptographic systems, that is the symmetrical (e.g. DES) one and non-symmetrical ones (Public Key Cryptosystems), may be applied.

The invention guarantees that personal data cards can be used only by their owners. No easily breakable "secret" memo codes (birthday, wedding date, etc.) as in today's systems are necessary. No user specific information remains in the terminal, assuring full user mobility. The security service station does not have to store user names and keys. The terminals can be kept inexpensive as the feature comparator is located in a central location and hence can be shared by many terminals or subscribers.

The method according to the invention can be used in Personal Access Control Systems with possibly insecure lines between feature extractor and comparator.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIG. 6, 6A and 6B are flowcharts illustrating a validation process in the apparatus according to FIG. 5.

DETAILED DESCRIPTION OF THE PREFERRED EMBODIMENTS

As the invention uses a pair of so-called "network keys", the concept of the network keys will first be explained. Thereafter, the logical operating sequence of a typical personal data card validation will be explained.

In communication networks with a large number of terminals or subscribers and frequently changing connections it is often advantageous to use Public Key Cryptosystems (PKC), see [2-11]. Central security equipment, if necessary, should be as simple as possible. Passive as well as active wire tapping has to be taken into account.

Figure 1:
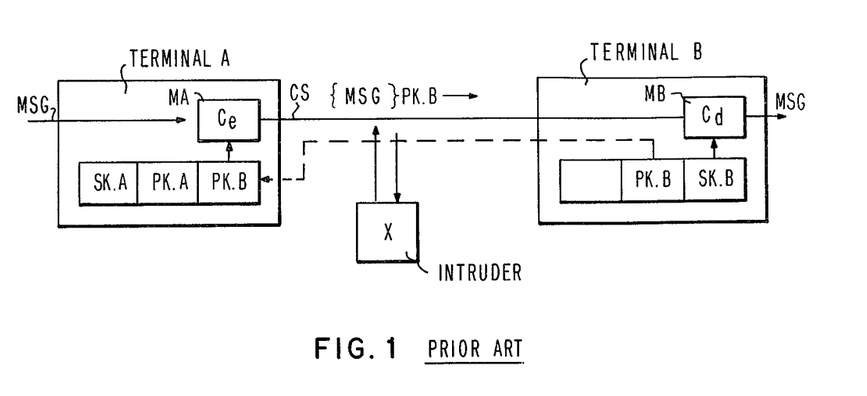
FIG. 1 is a diagram illustrating the prior art concept of Public Key Cryptography.

FIG. 1 schematically shows a PKC system according to the prior art, see [2]. Two stations or terminals A and B are connected to each other via a communication system CS. Ther terminals A and B contain PKC crypto modules MA and MB, respectively. These modules MA and MB operate with a predetermined encryption algorithm Ce and a predetermined decryption algorithm Cd, respectively. The terminal A is provided with a public key PK.A and a secret key SK.A. Similarly, the terminal B is provided with a public key PK.B and a secret key SK.B. In order to send a message MSG to the terminal B, the terminal A must get the public key PK.B of the terminal B. It then encrypts the message MSG under this key PK.B and sends the encrypted message or cryptogram {MSG}PK.B to the terminal B. In the terminal B the secret key SK.B is used for decryption. A passive intruder X connected to the communication system CS is not able to derive intelligible information from the cryptogram. But if the intruder X becomes active, i.e. if the intruder X inserts messages without being detected, countermeasures are necessary. These countermeasures comprise application of a public network key PK.N and a secret network key SK.N. as illustrated in FIG. 2 and as will be explained in greater detail subsequently.

Figure 2:
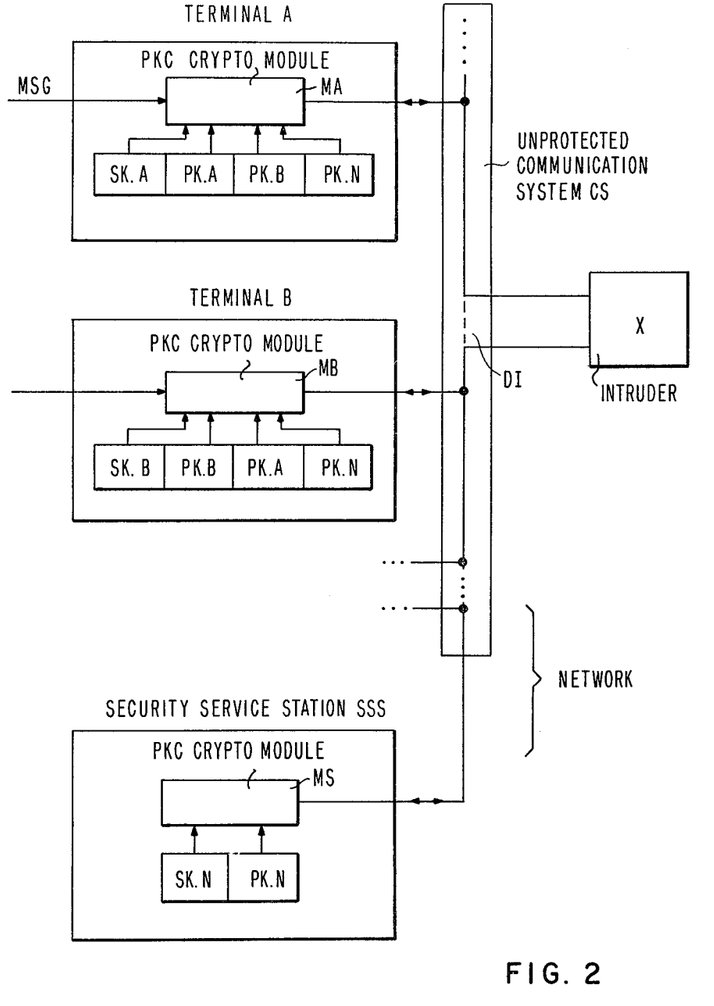
FIG. 2 is a diagram illustrating an apparatus containing various terminals and a security service station connected to an unprotected communication system, said apparatus undergoing a disconnection check.

In FIG. 2 the case of decentralized key storage is shown. After being asked by the terminal A, the terminal B transmits its public key PK.B to the terminal A. Passive wiretapping of the key PK.B is of no use for the intruder X as he cannot decrypt with it. However, if the intruder X replaces B's key PK.B by his own key PK.X, he is able to read A's encrypted messages by decryption with his secret key SK.X. For the terminal A there is no way to decide whether the received key came from the terminal B, as claimed, or from the intruder X.

The solution of this problem is based on the following assumptions:

(a) One or more so-called "Security Service Stations" SSS are installed in the Communication System CS. The Station SSS is located in a physically secure area, e.g. at a network node.

(b) The Station SSS uses a pair of the aforementioned "network keys" PK.N and SK.N. The key PK.N is made public. Although this key PK.N is not secret it must be assured that no one can shield any terminal from being supplied with the proper key PK.N. A simple way to achieve this is to publish PK.N in the newspaper.

(c) The Station SSS is able to carry out the following simple functions:
 receiving a short message;
 decrypting this message via a PKC algorithm using the secret network key SK.N;
 modifying the message by applying a publicly known function (e.g. by adding 1);
 encrypting the modified message and sending it back to the inquiring terminal;
 notifying a supervisor (man or machine) if there is any conflict.

It should be noted that SSS, the Security Service Station, does not need any extensive storage facilities for long messages, subscriber names or their public keys. According to FIG. 2, the Station SSS basically contains a PKC crypto module MS which communicates with the communication system CS.

During an active wiretapping by the intruder X one of the terminals A,B, . . . is necessarily disconnected from the network CS and SSS, at least during certain periods of time. In FIG. 2 the disconnection is designated by DI. The assumably disconnected terminal A could try to detect such a situation by sending messages to the network CS, SSS, i.e. the nearest node, but the answers could be simulated by the intruder X. The method illustrated in FIG. 3 can prevent this.

Figure 3:
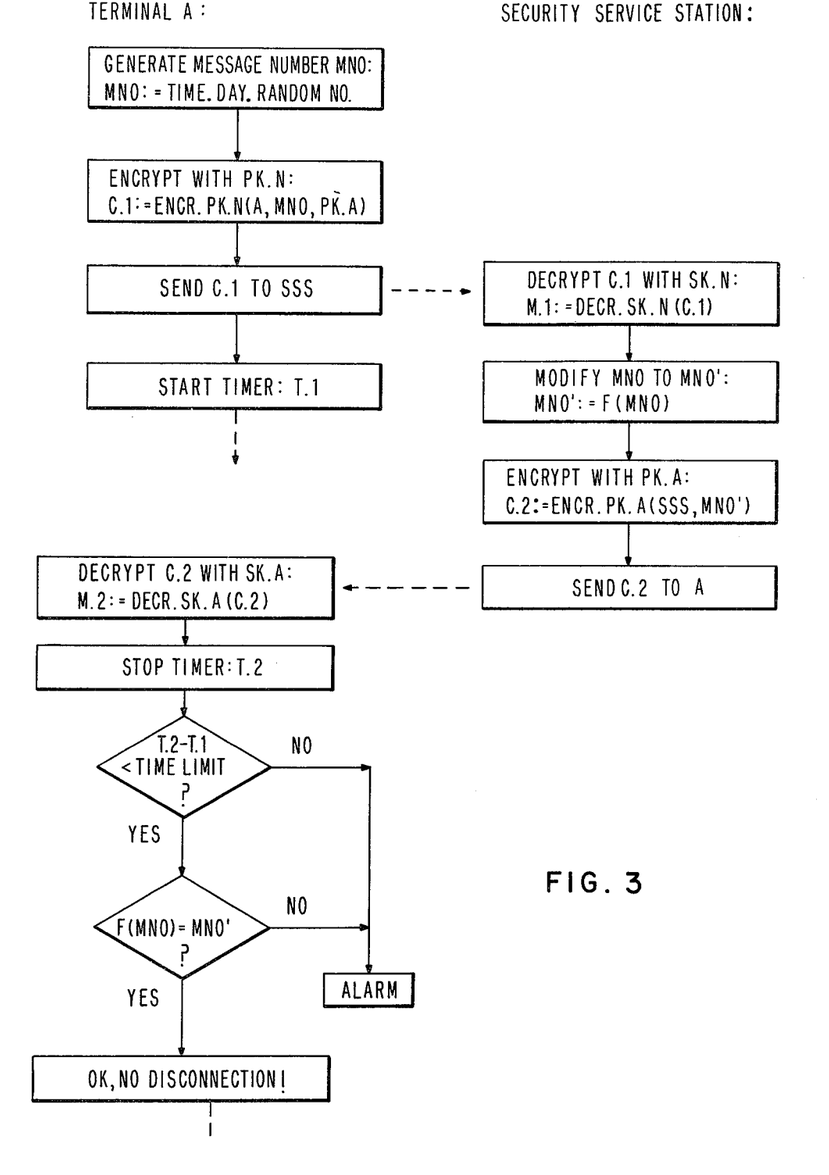
FIG. 3 is a flowchart illustrating a disconnection check in an apparatus according to FIG. 2.

According to the flowchart of FIG. 3, the following steps will be taken:

1. The affected terminal (for example terminal A) sends at randomly selected times and as often as possible a short message C.1 to the Security Service Station SSS. This message C.1 includes the indication or address (A) of the sender A and his public key PK.A. As it has to be unique, it additionally contains a message number MNO consisting of the time, date and a random number. The combination (A, MNO, PK.A) then is encrypted under the public network key PK.N, that is:

$$C.1 = \{A, MNO, PK.A\}\, PK.N \tag{1}$$

The notation "{...} PK" means PKC encryption under the key PK. This message C.1 is transmitted to the Security Service Station SSS.

2. If there is no disconnection DI, the message C.1 is decrypted by the Station SSS with the key SK.N. Therefore, $M.1 = DECR.SK.N(C.1)$ will be obtained. The message number MNO is modified to MNO′ by a publicly known function f and along with the address (SSS) of the Station SSS encrypted under the public key PK.A of the terminal A. This results in a message C.2

$$C.2 = \{SSS, MNO'\} PK.A \qquad (2)$$

which is sent back to the terminal A. Here it is decrypted with the secret key SK.A of the terminal A.

In order to determine whether a disconnection DI prevails, a timer is started at the time t.1 when the first message C.1 is sent to the station SSS. The timer is stopped at the time t.2 when the second message C.2 is received by the terminal A. An evaluation is made whether the time difference (t.2−t.1) is within a predetermined time limit. If it is not, an alarm is caused. If it is, the determination is made whether f(MNO) as evaluated in terminal A equals MNO' as received from Station SSS. If these data are not equal, an alarm is caused.

One could think of the following attempts to breach this security system:

1. The intruder X tries to simulate the answer of the Station SSS. This is impossible as the intruder X cannot decrypt the message C.1 and properly modify the number MNO.

2. The intruder X receives the message C.1 and hands it without change via another line to the station SSS to have it validated.

But the station SSS tries to send back the answer to the indicated sender's physical address and therefore necessarily notices that the terminal A has already built up a connection to another party (the intruder X is interested in intercepting only during terminal A's connection periods). Because of the resulting conflict situation an alarm call is issued by the Station SSS to a supervisor system.

To reduce the probability of detection the intruder X must keep the time of interference as short as possible. On the other hand, the terminals A, B, . . . should send their messages as often as possible in order to increase this probability of detection.

Figure 4:
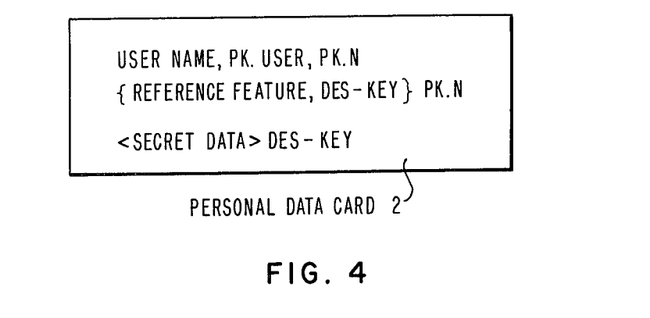
FIG. 4 illustrates a personal data card and the information contained therein.
Figure 5:
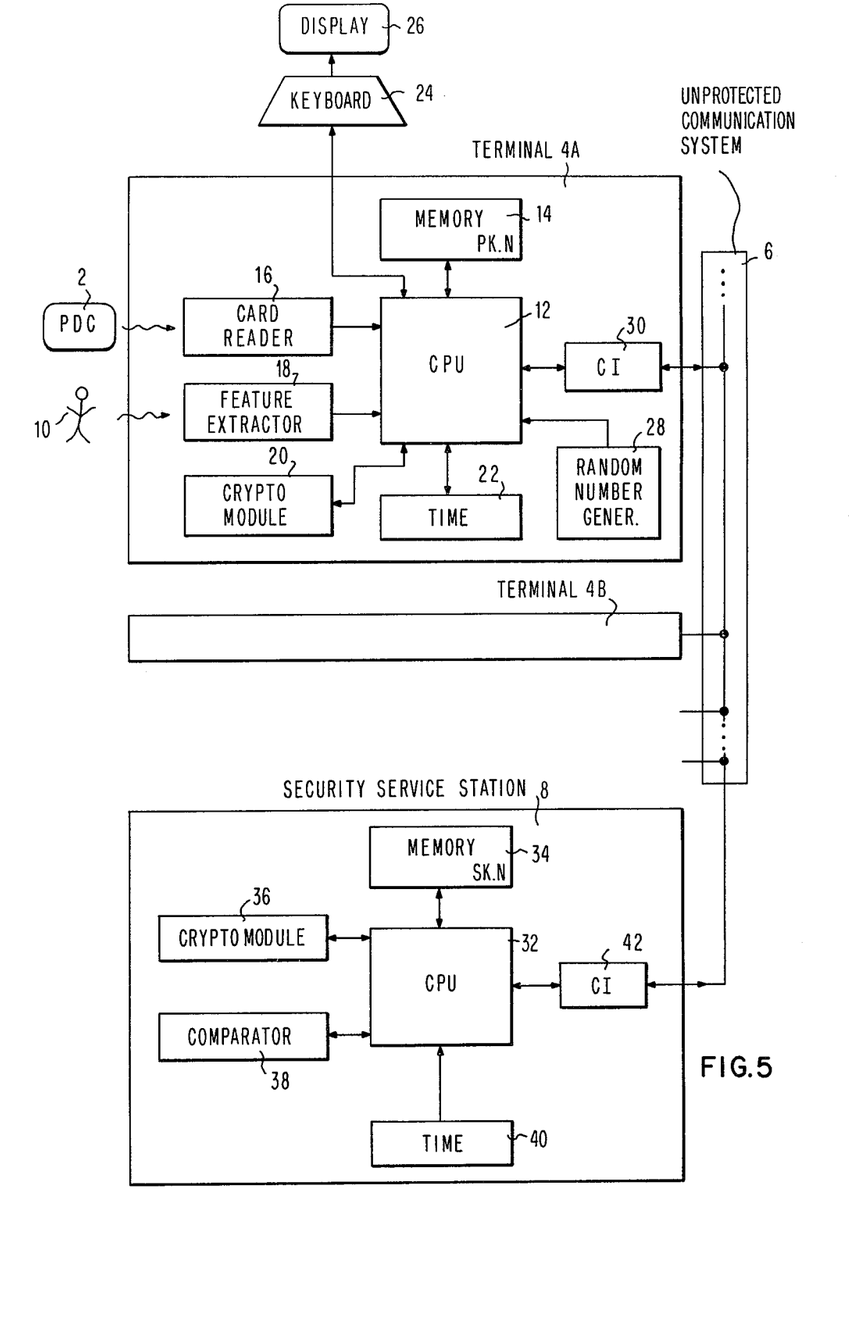
FIG. 5 is an apparatus for identity verification according to the invention.
Figure 6A:
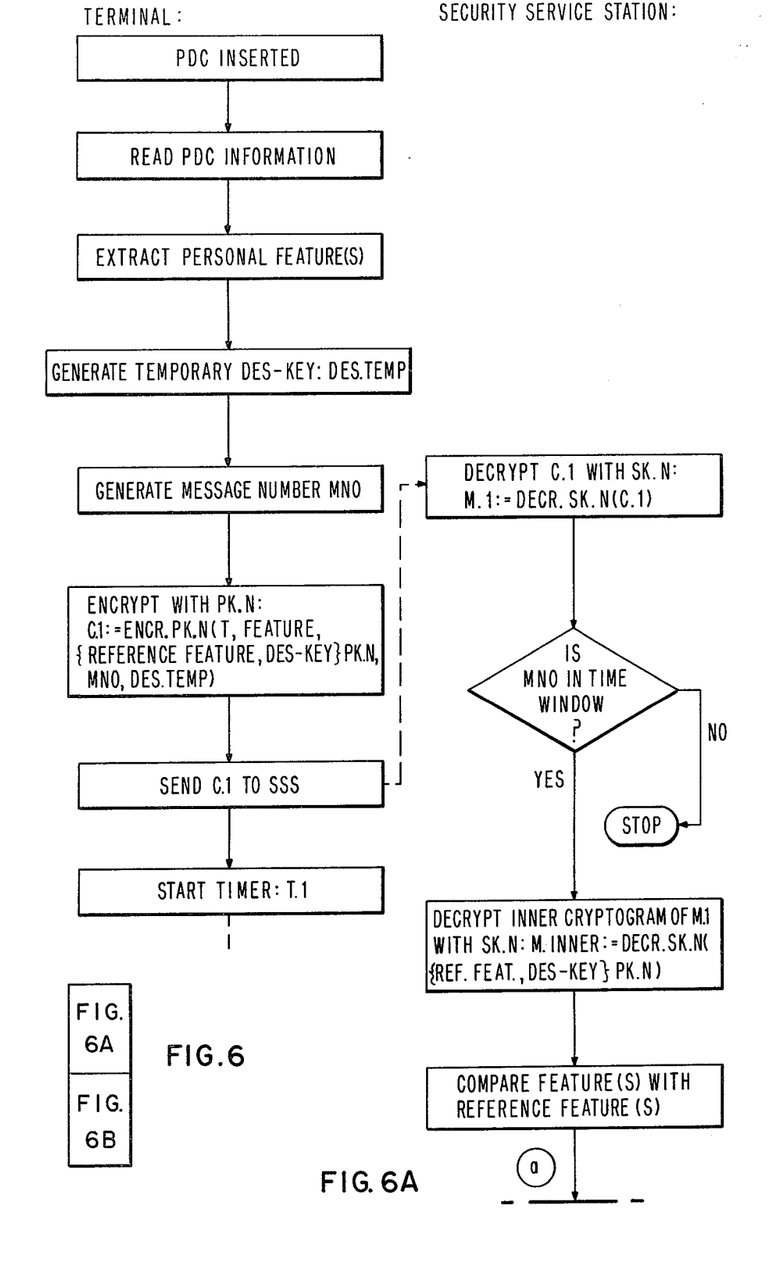
Figure 6B:
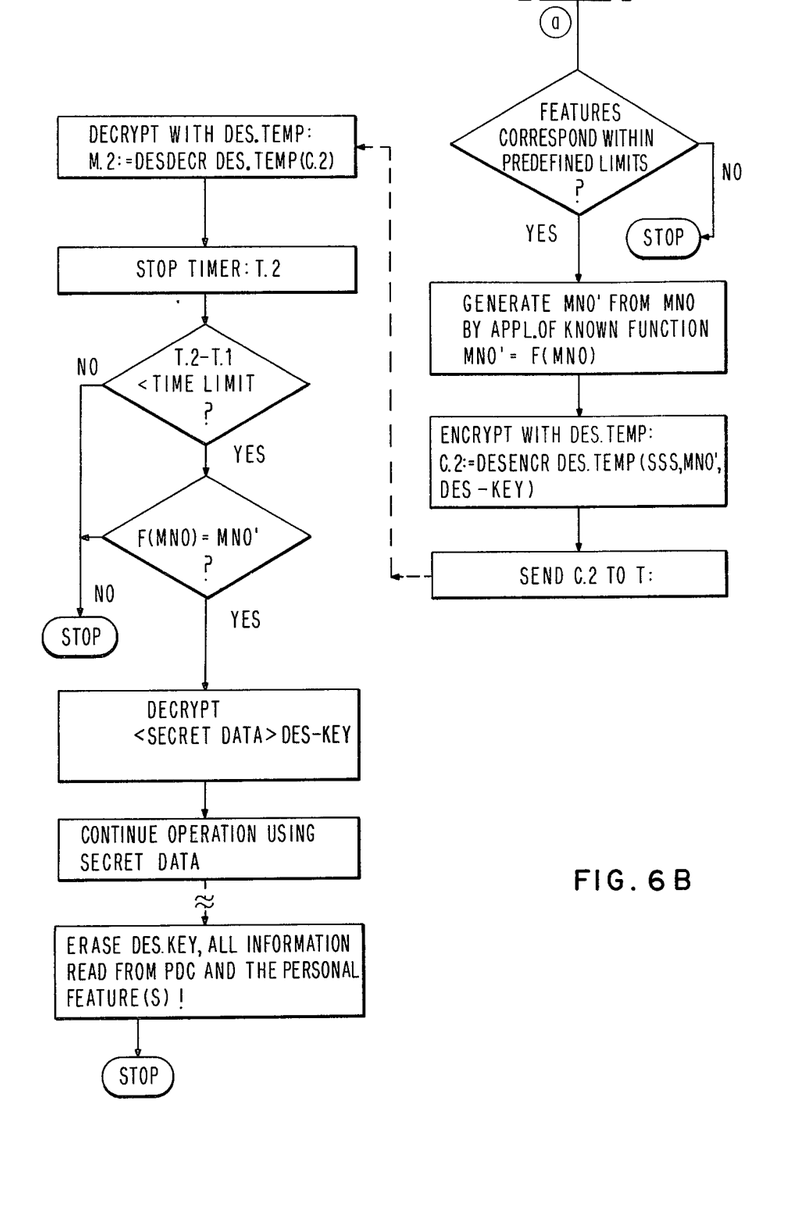

With reference to FIGS. 4–6 the protocol for a validation of a personal data card (PDC) will now be explained.

According to FIG. 4, a personal data card 2 contains sensitive and/or secret information. The data stored on a PDC must not be disclosed to an unauthorized person nor must it be possible to change these data without authorization and without detection. The information on the personal data card 2 has the following structure: it contains the name of the user USER NAME, the public key of the user PK.USER, and a public network key PK.N. It is again assumed that the public network key PK.N has been published. The card 2 further contains a reference feature REFERENCE FEATURE, and a key of a symmetrical cryptographic system, especially a DES-KEY. If a personal identification number (PIN) method is used, the REFERENCE FEATURE would be replaced on the card 2 by the PIN. It will be noted that the REFERENCE FEATURE as well as the DES-KEY are encrypted with the public network key PK.N. Subsequently, a PKC encryption will be denoted {. . .} whereas a DES encryption will be denoted <. . .>. Finally, the card 2 contains SECRET DATA which has to be protected. These SECRET DATA are encrypted with the DES-KEY. Thus, the card 2 contains a non-symmetrical cryptogram as well as a symmetrical cryptogram.

In FIG. 5, an apparatus for identity verification using a data card 2 is illustrated. The apparatus is designed such that it provides protection against misuse of the card 2 by unauthorized users.

The apparatus contains various terminals 4A, 4B, . . . which are connected to an unprotected communication system 6. This communication system 6 may be, for instance, a telephone or a broadcasting net. It may also be a packet switching network. Such communication system 6 is easily accessable to intruders. To the communication system 6 is also connected a security service station 8. The individual terminals 4A, 4B, . . . may all have the same design. Therefore, only the terminal 4A will be considered more closely.

To provide an unforgeable link between the card owner and the card 2, personal identification information is introduced into the terminal 4A. The personal feature is symbolized by the card owner 10. The personal verification may be based on voice or fingerprint recognition. However, in some instances, it may be sufficient that the card owner enters his personal identification number PIN via a keyboard instead. Unfortunately the personal features extracted from the owner 10 cannot be used directly for generating cryptographic keys as the resulting bit patterns vary to a certain degree. The crypto keys, on the other hand, must be reproduceable bit by bit. In order to overcome this problem, the security service station 8 is equipped with a personal feature/reference feature comparator, as will be explained later. The security service station 8 uses, as mentioned earlier, a pair of network keys, PK.N and SK.N. Ther terminal 4A is equipped with a central processing unit 12 with which is associated a memory 14. Instead of the central processing unit 12 and a separate memory 14, a microcomputer may be used which already contains a memory. The central processing unit 12 preferably may be a microprocessor. The memory 14 is used for storage of a program, of the public network key PK.N, and of variables.

A card reader 16 is used for reading the information from the personal data card 2. The card reader 16 is connected to the central processing unit 12. The card data are introduced into the memory 14 via the central processing unit 12. A feature extractor 18 is provided for extracting specific features of the card owner 10 into the memory 14. The feature extractor 18 has an input device such as a fingerprint sensor which has to be used by the card owner 10 in a verification process. The feature extractor 18 is also connected to the first central processing unit 12.

A very important unit in the terminal 4A is a crypto module 20. The crypto module 20 is also connected to the central processing unit 12. Preferably, the crypto module 20 may comprise two units, namely a DES crypto unit and a PKC crypto unit. The PKC unit specifically may comprise a chip that works according to the so-called RSA method which is known in the art from reference [3]. Generally it has to be mentioned that the crypto module 20 should be able to handle DES as well as PKC algorithms.[*1] The crypto module 20 is adapted to encrypt and decrypt data received from the memory 14 under the control of the central processing unit 12.

[*1] However, a symmetrical system (e.g. DES) is not necessary. A PKC algorithm could be used it its place without compromising the security of the system. The reason for using symmetrical cryptoalgorithms is their higher speed.

Associated with the central processing unit 12 is a time generator or clock 22. This time generator is used to determine the time period which has elapsed between sending a message and receiving a response message, as will be explained later. The time generator is also used to determine the time and date included in the message number MNO. A keyboard 24 provides access to the unit 12 from outside. A display device 26 may be associated with the keyboard 22. A random number generator 28 is also connected to the central processing unit 12. This generator is used for generating a temporary key.*[2] The central processing unit 12 is connected to the communication system 6 via a communication interface 30.

*[2] and a random number to be included in the message number MNO.

It will be noted that the design of the security service station 8 is similar to that of the terminal 4A. The security service station 8 also contains a central processing unit 32 which has a memory 34. The memory 34 is used for storage of a program, of a secret network key SK.N, and of variables.

A crypto module 36 is connected to the central processing unit 32. This crypto module 36 is used to encrypt and decrypt data received from the second memory 34 under the control of the central processing unit 32. The crypto module 36 should have the same design as the crypto module 20 of the terminal 4A.

The central processing unit 32 works together with a comparator 38 which is connected thereto. This comparator 38 is used for compairing transmitted personal identification information with reference personal identification information which is also transmitted via the communication system 6.

In the security service station 8 there may also be provided a time generator or clock 40. This time generator 40 may also be used in connection with the determination of the time period elapsed between emitting and receiving a message. The central processing unit 32 is connected to the communication system 6 through a communication interface 42.

The crypto module 20 is preferably designed such that it works as a public key system using a public network key PK.N in its encrypting operation mode and as symmetrical or DES system using a symmetrical or DES key and additionally a temporary symmetrical or DES key in its decrypting operation mode. The crypto module 36 may preferably be designed such that it works as a public key system using a secret network key SK.N in its decrypting operation mode and as a symmetrical or DES system using the temporary symmetrical or DES key in its encrypting operation mode. As conventional, the secret network key SK.N is correlated to the public network key PK.N.

In absence of a card user 10 the terminals 4A, 4B ... are "empty", that is no user keys or reference features are stored. After insertion of the personal data card 2, the respective module 4A or 4B is dedicated to the specific user 10 if the validation procedure has been carried out successfully.

In FIG. 6 a flowchart is illustrated indicating how a validation process may be performed. On the left side of FIG. 6 the actions of the terminal are registers, whereas on the right side of FIG. 6 the actions of the security service station 8 are described.

According to FIG. 6 a PDC validation process is started by inserting the personal data card 2 into the card reader 16 and by activating the sensor of the feature extractor 18. Instead of a personal feature, also a personal identification number may be entered into the terminal 4A. The card reader 16 will read the PDC information, and the feature extractor 18 will extract personal feature(s) from the card user 10. The information read by the card reader 16 may be preferably comprise all information contained in the card 2, as shown in FIG. 4. Subsequently the central processing unit 12 generates a temporary DES key at random which is designated as DES.TEMP. The random number genrator 28 is used for this prupose. There is also generated a message number MNO. Now the following data are present in the terminal 4A: the address T of the terminal 4A which sends the message, the FEATURE extracted by the feature extractor 18, the cryptogram (REFERENCE FEATURE, DES key) PK.N obtained from the personal data card 2, the message number MNO, and the temporary DES key DES.TEMP. These data are now encrypted with the public network key PK.N to form a first message C.1.

The first message C.1 is sent to the security service station 8 via the communication system 6. At this point the time from time generator or timer 22 is read into the memory forming a first time T1.

The first message C.1 is decrypted by the security service station 8 with the secret network key SK.N. This is done by the crypto module 36. As a result all data contained in the curved ( . . . ) parentheses of the message C.1 are now available in the station 8. Subsequently it is checked whether the received message number MNO is situated in a predetermined time window. If this is the case, the message number MNO is valid.

Now the inner cryptogram of the first message C.1, that is the cryptogram {REFERENCE FEATURE, DES key} PK.N, is decrypted with the secret network key SK.N. Thus, the REFERENCE FEATURE and the DES key will be obtained as clear data.

The next step is to compare the transmitted FEATURE with the transmitted REFERENCE FEATURE. The comparison is performed by the comparator 38. Such comparators are, for instance, known in the conventional PACS (personal access control) methods.

If the comparison is positive, i.e. the features correspond within predefined limits a modified message number MNO' is generated. This modified message number MNO' is obtained from the transmitted message number MNO by applying a publicly known function F.

As a next step, the following data are encrypted with the temporary DES key DES.TEMP: the address SSS of the security service station 8, the modified message number MNO', and the DES key. The encryption results in a second message C.2. This second message C.2 is sent to the terminal.

Here, the received second message C.2 is decrypted with the temporary DES key DES.TEMP. On arrival of the second message C.2 the time generator 22 is read at a time T.2. If the time difference (T.2−T.1) is smaller than a predetermined time limit, then a determination is made whether the modified message number MNO' is okay. For this purpose, in the station 8 the function F is applied to the message number MNO previously sent out. Thus, the modified number F(MNO) is obtained. If this number F(MNO) equals the received modified message number MNO', that is if the check is positive, the SECRET DATA of the card 2 are decrypted by the aid of the DES key. Then the operation is continued using the required SECRET DATA.

Finally, the DES key, all information read from the personal data card 2 and the personal FEATURE are erased from the memory 14 of the terminal 4A, and the operation is stopped.

In order to satisfy the demands of Data Security Laws the SECRET DATA could be structured by additional encryptions assuring that only certain parts of it may be accessed at a time.

The advantages of the apparatus illustrated in FIG. 5 and of the method shown in FIG. 6 are as follows:

(a) The personal data card (PDC) may contain data which have to be pretected against misuse. These data are effectively protected since access is only permitted after a positive identity check. Thus, it is guaranteed that personal data cards can only be used by their owners.

(b) The terminal itself does not need to contain a comparator in order to determine whether the authorized user has inserted the card into the card reader and additionally supplied a personal feature or a personal identification number (PIN). In the present invention such a comparator is incorporated into the security service station. It can be shared by a large number of terminals. As a result, a relatively inexpensive system for cryptographic identity verification is obtained.

(c) The security service station does not have to store any data of the user, such as user names and keys, since these data are stored in an encrypted form on the personal data card. Therefore all changes of the user data will be made on the card itself. It is not necessary to update such data in the security service station.

(d) Another advantage resides in the fact that any security service station to which is connected the terminal in use can perform the validation as long as this station is provided with the secret network key (SK.N). That means that a single personal data card can be used in connection with separate security stations without the necessity of any communication about the personal features between these stations. This feature grants wide mobility for the user. In other words, the user can utilize his or her card at various locations.

(e) In the apparatus and method according to the invention a non-ambiguous identity verification is possible even though the connections between the terminal and the communication system including the security service station may be unprotected.

(f) As no information remains in the terminal again wide mobility is assured for the user.

While the forms of the cryptographic apparatus and method herein described constitute preferred embodiments of the invention, it is to be understood that the invention is not limited to these precise forms of assembly, and that a variety of changes may be made therein without departing from the scope of the invention.

What is claimed is:

1. An apparatus for identity verification using a data card with protection against misuse of said card by unauthorized users, comprising in combination:
    (a) a terminal containing
        (a1) a first central processing unit having a first memory for storage of a program, of a public network key, and of variables;
        (a2) a card reader for reading data from said personal data card and for introducing said data into said first memory, said data including sensitive data;
        (a3) input means for introducing personal identification information into said first memory;
        (a4) a first crypto module connected to said first centeral processing unit, said first module being adapted to encrypt and decrypt data received from said first memory under the control of said first central processing unit;
    (b) a security service station containing
        (b1) a second central processing unit having a second memory for storage of a program, of a secret network key, and of variables;
        (b2) a second crypto module connected to said second central processing unit, said second crypto module being adapted to encrypt and decrypt data received from said second memory under the control of said second central processing unit;
        (b3) a comparator connected to said second central processing unit for comparing transmitted personal identification information with transmitted reference personal identification information, and
    (c) a communication system connecting said terminal to said security service station, said communication system transmitting digital data from said terminal to said security service station, and vice versa, including said personal identification information and said reference personal identification information.

2. The apparatus according to claim 1, wherein said first crypto module is such that it works as a public key system using a public network key in its encrypting mode,*3 and wherein said second crypto module is such that it works as a public key system using a secret network key in its decrypting mode and as a symmetrical system using said temporary second key in its encrypting mode, whereby said secret network key is correlated to said public network key.

*3 and as a symmetrical system using a first key and a temporary second key in its decrypting mode.

3. The apparatus according to claim 2, wherein said symmetrical system is the DES system, wherein said first key is a DES key, and wherein said temporary second key is a temporary DES key.

4. The apparatus according to claim 2, further comprising a random number generator for generating said temporary second key, said temporary second key being transmitted in an encrypted form to said security service station.

5. A method for cryptographic identity verification, comprising the following steps:
    (a) reading card information from a personal data card and entering personal feature data into a terminal, said card information comprising reference feature data as well as a first key, said reference feature data and said first key both being encrypted with a public network key, thereby forming a first cryptogram;
    (b) generating a temporary key and a message number in said terminal;
    (c) encrypting said personal feature data, said first cryptogram contained in said card information, said message number and said temporary key with a public key in said terminal, thereby forming a first message;
    (d) sending said first message to a security service station via a communication system;
    (e) decrypting said first message including said first cryptogram with a secret network key in said security service station, thus obtaining said first key, said message number, said feature data, said reference feature data, and said temporary key, whereby said secret network key is correlated to said public network key;

(f) comparing said feature data and said reference feature data with each other in said security service station;

(g) generating a modified message number by applying a publicly known function to said message number in said security service station;

(h) encrypting said modified message number and said first key with said temporary key in said security service station, thereby forming a second message;

(i) sending said second message to said terminal via said communication system;

(j) decrypting said second message with said temporary key in said terminal, thereby obtaining said modified message number; and (k) comparing said modified message number with a generated modified message number in said terminal, said generated modified message number being self-generated in said terminal by applying said publicly known function to said message number.

6. A method for detection of a disconnection between a terminal and a communication system, said terminal having a first crypto module which works as a public crypto system and which is adapted to encrypt thereby using a public network key and which is adapted to decrypt thereby using a secret key of its own, said terminal providing a public key of its own and being provided with a predetermined function, a terminal address, and a station address, comprising the following steps:

(a) forming a first message in said terminal, said first message comprising
   (a1) said address of said terminal
   (a2) a unique message number, and
   (a3) said public key of said terminal;

(b) encrypting said first message under said public network key, (c) sending said encrypted first message to a security service station, said station address being assigned to said station;

(d) decrypting said first message with a secret network key in said security service station, said secret network key being correlated to said public network key unambiquously, thereby identifying said address, said unique message number and said public key of said terminal, (e) modifying said identified message number by using said predetermined function, thereby obtaining a modified message number, (f) forming a second message in said security service station, said second message comprising;
   (f1) said address of said security service station and
   (f2) said modified message number, (g) encrypting said second message under said public key of said terminal;

(h) sending said encrypted second message to said terminal, thereby using said address of said terminal for addressing said terminal;

(i) decrypting said encrypted second message in said terminal with said secret key of said terminal, thereby identifying an address and a modified message number, (j) modifying said unique message number according to said predetermined function; and (k) comparing said identified modified message number with said modified unique message number, thereby authenticating said security service station and confirming the presence of a connection between said terminal and said communication system.

7. The method according to claim 6, wherein a time stamping method is applied for determining whether a predetermined time has been exceeded between sending said encrypted first message and receiving said decrypted second message.

8. The method according to claim 7, wherein a time clock is started when said encrypted first message is sent to said station, and wherein said time clock is stopped when said second message has been decrypted.

* * * * *